US005808736A

United States Patent [19]

Womack et al.

[11] Patent Number: 5,808,736

[45] Date of Patent: Sep. 15, 1998

[54] THIN FILM FLYING HEIGHT CALIBRATION DISK FOR CALIBRATING FLYING HEIGHT TESTERS

[75] Inventors: Kenneth H. Womack; Carlos A. Duran; Christopher A. Lacey, all of San Diego, Calif.

[73] Assignee: Phase Metrics, Inc., San Diego, Calif.

[21] Appl. No.: 718,899

[22] Filed: Sep. 24, 1996

[51] Int. Cl.[6] .......... G01J 1/02

[52] U.S. Cl. .......... 356/243; 356/357

[58] Field of Search .......... 356/243, 357

[56] References Cited

U.S. PATENT DOCUMENTS

| | | | |
|---|---|---|---|
| 3,642,372 | 2/1972 | Rittenhouse | 356/3 |
| 4,624,564 | 11/1986 | Dahlgren | 356/243 |
| 4,813,782 | 3/1989 | Yagi et al. | 356/357 |
| 4,828,895 | 5/1989 | Bickert et al. | 428/65 |
| 5,168,413 | 12/1992 | Coker et al. | 360/137 |
| 5,218,424 | 6/1993 | Sommargren | 356/357 |
| 5,239,364 | 8/1993 | Matsuzaki | 356/360 |
| 5,257,093 | 10/1993 | Mager et al. | 356/375 |
| 5,406,373 | 4/1995 | Kamon | 356/401 |
| 5,410,402 | 4/1995 | Li et al. | 356/243 |
| 5,440,386 | 8/1995 | Campas | 356/243 |
| 5,552,884 | 9/1996 | Li et al. | 356/243 |

*Primary Examiner*—Richard A. Rosenberger
*Attorney, Agent, or Firm*—Blakely Sokoloff Taylor & Zafman

[57] ABSTRACT

A calibration medium that is used to calibrate a flying height tester which measures the gap of an air bearing formed between a magnetic recording head and a substrate. The medium contains a first ridge and a second ridge that extend from an underlying substrate. The ridges may be coated with a reflective material. A flying height tester can be calibrated by measuring light reflected from each ridge. The ridges have varying thicknesses so that the calibration medium will produce multiple data points.

19 Claims, 2 Drawing Sheets

32
$32_1$
40
30
36
$32_2$
$32_3$
$32_4$
$32_5$
52
$32_6$
$32_7$
50
$32_8$
38
54
$32_9$
$32_{10}$

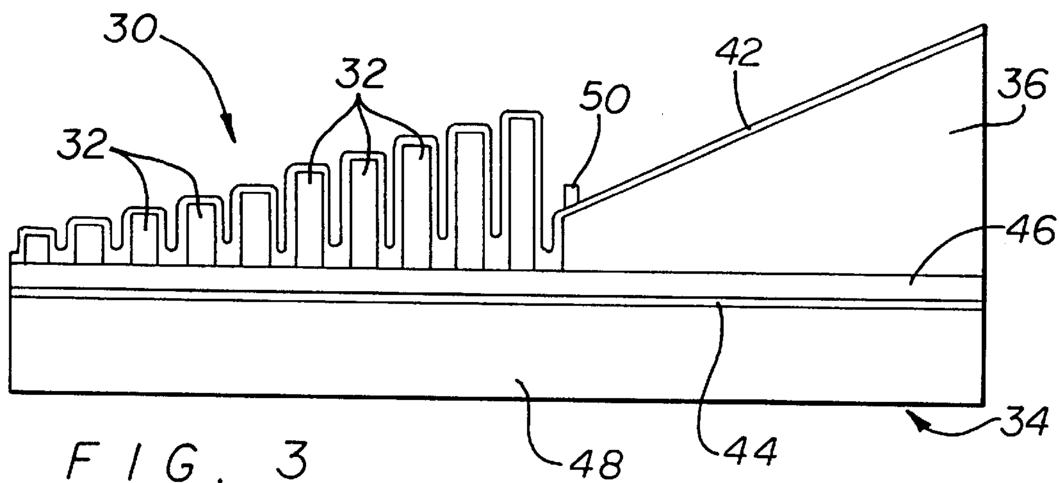
F I G. 3
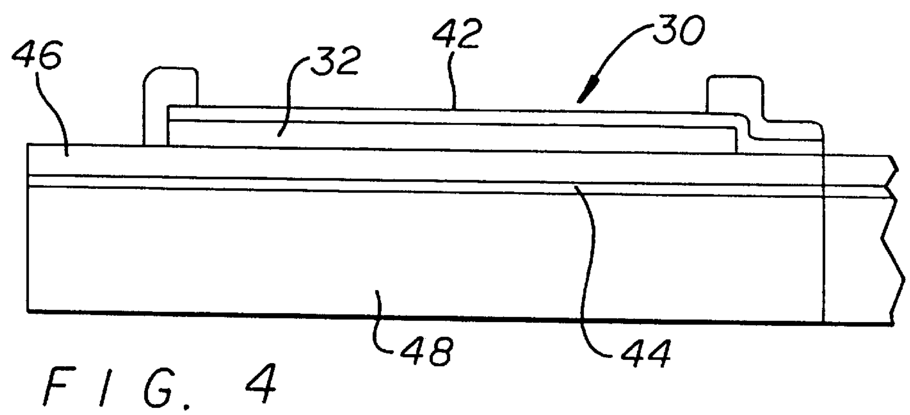
F I G. 4
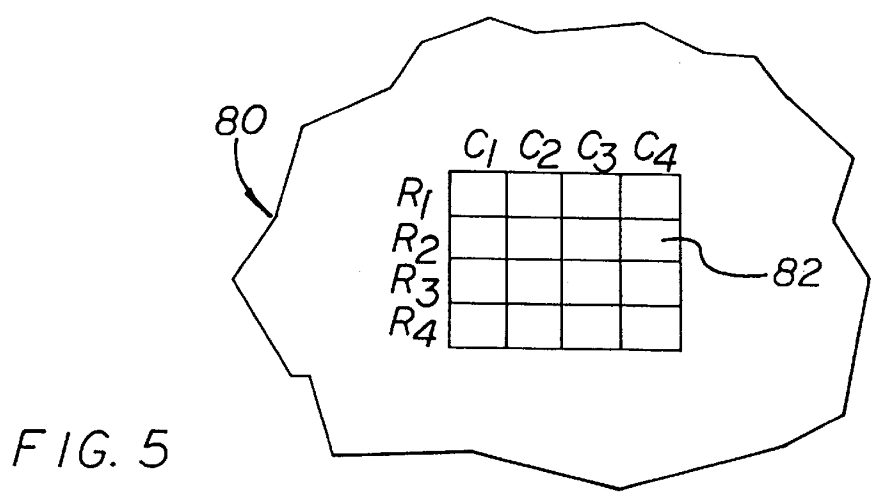
F I G. 5

THIN FILM FLYING HEIGHT CALIBRATION DISK FOR CALIBRATING FLYING HEIGHT TESTERS

BACKGROUND OF THE INVENTION

1. Field of the Invention

The present invention relates to a calibration medium for calibrating a flying height tester that measures the flying height of a magnetic recording head.

2. Description of Related Art

Hard disk drives contain magnetic recording heads that magnetize and sense the magnetic field of a rotating disk. The recording heads are typically mounted to a gimbal located at the end of a suspension arm. The arm and head are commonly referred to as a head gimbal assembly (HGA).

The recording heads contain aerodynamic features which create an air bearing that separates the heads from the disk. The recording heads are designed so that the air bearings prevent mechanical wear while optimizing the magnetic coupling between the disk and the transducers within the heads. The air bearing of an HGA is typically measured by an apparatus commonly referred to as a flying height tester. Flying height testers contain a loader which places an HGA adjacent to a rotating transparent disk. Light is directed through the disk and reflected from the head/disk interface. The reflected light creates an interference pattern which is detected and analyzed to compute the gap of the air bearing.

Flying height testers must be calibrated to insure accurate test results. U.S. Pat. No. 4,624,564 issued to Dahlgren discloses an apparatus and method for calibrating a flying height tester. The Dahlgren system includes a "standard unit" that is placed below the transparent disk to simulate a magnetic recording head. The standard unit has a reflective layer that is covered by a transparent layer. The transparent layer has a known thickness that corresponds to a gap of an air bearing gap.

In the Dahlgren system, the light of the flying height tester is directed through the rotating substrate and onto the standard unit. Light is reflected from the top surface of the transparent layer and the underlying reflective coating to create an interference pattern. Knowing the thickness of the transparent layer the instrument can be calibrated with the measured light intensity of the reflected light.

There has been developed flying height testers which can measure optical properties of the slider while measuring the air bearing gap. Calibrating such testers typically requires a number of different data points. The Dahlgren standard unit contains a single transparent layer which provides only one data point. It would therefore be desirable to provide a calibration medium that would provide a plurality of data points for the calibration of a flying height tester. Since it contains only a single transparent layer of uniform thickness, the Dahlgren unit makes no provision for measurement of maxima and minima of the interference signal which are required for computation of flying height in an interferometric flying height tester.

SUMMARY OF THE INVENTION

The present invention is a calibration medium that is used to calibrate a flying height tester which measures the gap of an air bearing formed between a magnetic recording head and a disk. The medium contains a first ridge and a second ridge that extend from an underlying substrate. The ridges may be coated with a reflective material. A flying height tester can be calibrated by measuring light reflected from each ridge. The ridges have varying thicknesses so that the calibration medium will produce multiple data points.

BRIEF DESCRIPTION OF THE DRAWINGS

FIG. 3 is a side sectional view of the calibration medium;

FIG. 4 is a representative cross-sectional view showing multiple ridges of the calibration medium;

FIG. 5 is a top view of an alternate embodiment of the calibration medium.

DETAILED DESCRIPTION OF THE INVENTION

Figure 1:
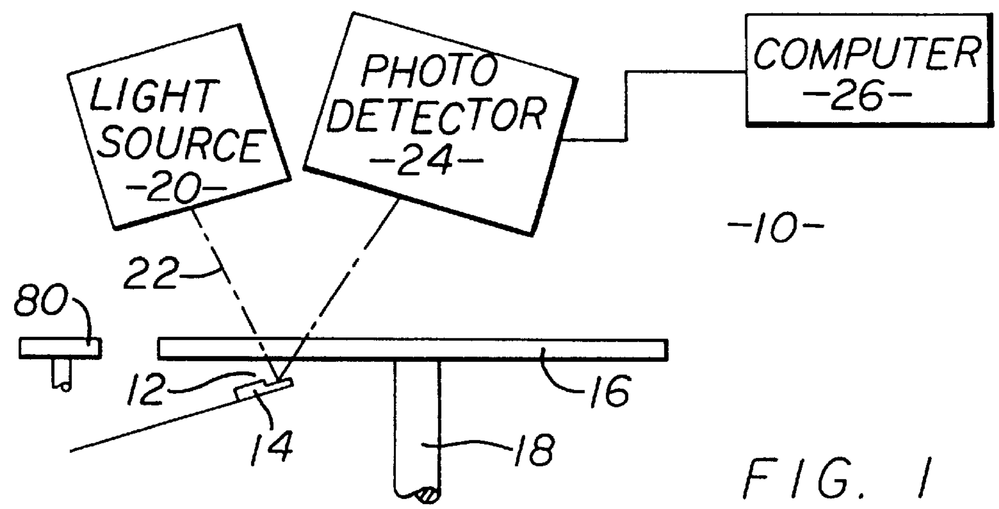
FIG. 1 is a schematic of a flying height tester.

Referring to the drawings more particularly by reference numbers, FIG. 1 shows a flying height tester 10 which measures the gap of an air bearing 12 that separates a magnetic recording head 14 from a transparent disk 16. The disk 16 is rotated by a spindle motor 18. The tester 10 includes a light source 20 that directs a beam of light 22 through the transparent disk 16. The light beam 22 is reflected from the head/substrate interface and detected by a photodetector 24. The reflected light creates an interference pattern that can be analyzed by a computer 26 to compute the gap of the air bearing 12. The optical system of the tester 10 is typically mounted to a gantry (not shown) that can move the light beam 22.

Figure 2:
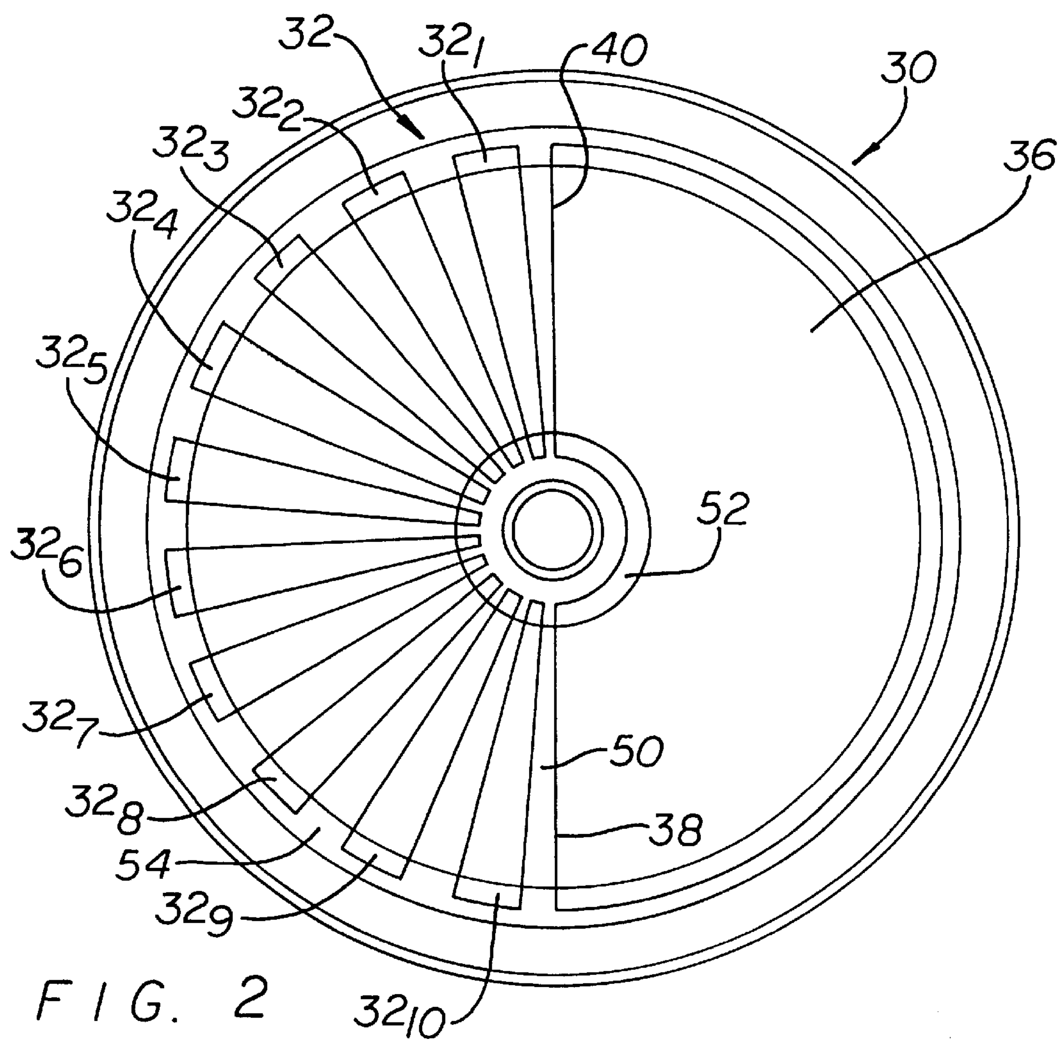
FIG. 2 is a top view of a calibration medium of the present invention.

FIGS. 2, 3 and 4 show a calibration medium 30 that replaces the disk 16 to calibrate the tester 10. The medium 30 is replaced with the substrate 16 after the tester is calibrated. The calibration medium 30 contains a plurality of individual ridges 32 that extend from a substrate base 34 along one half of the medium 30. Each ridge 32 has a different thickness and corresponding optical length. The thicknesses are typically selected to correspond to different equivalent air bearing gaps. Table I provides the thickness of the ridges and the corresponding equivalent air bearing gap. The thicknesses are provided in units of quarter wave optical thickness (QWOT) at 546 nanometers.

TABLE 1

| Transparent Layer Reference No. | Thickness ± 0.01 QWOT (@ 546 Nanometers) | Equivalent Air Gap (Microinches) |
|---|---|---|
| 321 | 0.372 + 0.067 | 0.2 |
| 322 | 0.0744 + 0.067 | 0.4 |
| 323 | 0.1116 + 0.067 | 0.6 |
| 324 | 0.1489 + 0.067 | 0.8 |
| 325 | 0.1861 + 0.067 | 1.0 |
| 326 | 0.3722 + 0.067 | 2.0 |
| 327 | 0.5583 + 0.067 | 3.0 |
| 328 | 0.7444 + 0.067 | 4.0 |
| 329 | 0.9305 + 0.067 | 5.0 |
| 3210 | 1.1160 + 0.067 | 6.0 |

The medium 30 may also have a tapered ridge 36 that extends across one-half of the base 34. The tapered ridge 36 has a minimum thickness at one end 38, a maximum thickness at another end 40, and a gradually varying thickness therebetween. The minimum thickness may be approximately 0.067+/−0.01 QWOT. The maximum height may be 10.5+/−0.05 QWOT.

The ridges 32 and 36 may be covered with a coating of reflective material 42. The substrate base 34 may contain a layer of partially reflective material 44 located between a layer of transparent material 46 and a transparent base member 48.

To calibrate the flying height tester, the light beam 22 is directed through the substrate base 34 and one of the ridges 32 of the medium 30. Light reflects from the interfaces of the medium 30 to create an interference pattern. The interference pattern is detected by the photodetector 24 and the data is stored in the computer 26. The medium 30 is rotated by the spindle motor 18 so that the light is directed through each ridge 32. The reflected light from each ridge 32 provides a number of data points that can be used to calibrate the tester. Additionally, the tester may store data as the light is directed through the tapered ridge to obtain a number of interference maxima and minima. One end of the tapered ridge 36 may have an optical marker 50 which identifies the start of the ridge 36. The marker 50 allows the tester 10 to determine the rotational portion of the medium relative to the light beam to properly correlate the measured data with each ridge 32. The marker 50 is preferably a strip of reflective material. The tapered ridge provides successive interference maxima and minima for flying height testers that require those measurements as inputs to the flying height calculation.

In the preferred embodiment, the medium 30 is constructed by forming the reflective layer 44 onto the base member 48. The base member 48 may be a sapphire or quartz material or glass. The reflective layer 44 may be a nickel or chrome material that is applied with a sputtering process. The transparent layer 46 is applied to the reflective layer 44. The transparent layer 46 may be a silicon dioxide $SiO_2$ that has a thickness of approximately 1.10+/−0.01 QWOT at 546 nm.

The ridges 32 and 36 are formed onto the transparent layer 46, typically by sputtering on silicon dioxide $SiO_2$. Each ridge 32 may be formed by masking off the remaining portion of the disk and sputtering on the transparent material to the desired thickness. The tapered surface of ridge 36 may be created by a subsequent grinding process. The reflective coating 42 may be applied to the ridges 32. The reflective coating 42 may be a sputtered layer of nickel or chrome that is approximately 10 nm thick.

As an alternate embodiment the ridges 32 and 36 may be initially sputtered to the same thickness and then etched to the desired heights. As yet another alternate method, the ridges 32 and 36 may be initially etched from a transparent substrate without sputtering $SiO_2$. The reflective layers 42 and 44 are then applied to the etched substrate. The base member 48 is formed onto the reflective layer 44. Additionally, although a medium 30 with the outer reflective layer 42 is shown and described, it is to be understood that the medium 30 can be constructed without the reflective layer 42. The light is then reflected through the outer surface of the ridges 32 and 36 and into the internal reflective layer 44.

The medium 30 may have an inner strip 52 of reflective material and an outer strip 54 of reflective material that extend onto the inner and outer ends of the ridges 32 and 36, respectively. The strips 52 and 54 provide a "bright" band which can be used to accurately measure the thickness of each ridge 32 with an instrument such as an optical profilometer.

FIG. 5 shows an alternate embodiment of a calibration medium 80. The medium 80 contains 16 different ridges 82 arranged into four different rows $R_{1-4}$ and four different columns $C_{1-4}$. Each ridge 82 has a different thickness. The ridges 82 can be constructed with a first coating of a metal oxide that has an index of refraction of 2 at 550 nm. In the preferred embodiment the first coating is a compound sold by Merck Co. under the part designation H4. A second coating is then applied to the first coating. The second coating may be silicon dioxide $SiO_2$ which has an index of refraction of 1.46 at 550 nm.

The medium 80 may be constructed with 5 separate coating steps. The first coating is initially applied by covering three columns of the array and coating the remaining exposed column to the appropriate thickness. This process is repeated for three different columns. The first column $C_1$ has no coating. The second column $C_2$ is coated with H4 to a thickness of 47.5 nm, the third column $C_3$ is coated to a thickness of 69.5 nm, and the fourth column $C_4$ is coated to a thickness of 94 nm. The second coating is then applied to the array by covering three rows of the array and coating the remaining exposed row to the appropriate thickness. This process is repeated for two different rows. The first row $R_1$ is not coated. The second row $R_2$ is coated with 127 nm of $SiO_2$ and the fourth row $R_4$ is coated with 60 nm of $SiO_2$. The third row $R_3$ is coated during the coating of rows $R_2$ and $R_4$ to create a $SiO_2$ thickness of 187 nm. A similar procedure could be followed during the application of the HA coatings to further reduce the number of coating steps.

The medium 80 can be particularly useful in providing a plurality of data-points for a flying height tester which measures the polarization of the light beam. In the preferred embodiment, the flying height tester splits the reflected light beam into four different beams that contain polarization information relating to the stokes parameters $S_0$, $S_1$, $S_2$ and $S_3$. The four light beams are detected by the photodector which provides intensity values $D_1$, $D_2$, $D_3$ and $D_4$. The intensities of the four light beams are defined by the equation:

$$D_i = A S_i$$

where;

$D_i$=the intensity vector that contains the intensities $D_1$, $D_2$, $D_3$ and $D_4$.

$S_i$=the stokes vector that contains the stokes parameters $S_0$, $S_1$, $S_2$, and $S_4$.

A=the instrument characteristic matrix.

The stokes vectors for each ridge can be calculated because of the known optical properties of the medium. The intensities $A_i$ are measured during the calibration routine. The instrument characteristic matrix can be calculated from the known stokes vectors $S_i$ and measured intensities $D_i$. The instrument characteristic matrix is then stored in the computer for use in measuring the air bearing gaps of recording heads. The instrument characteristic matrix typically contains 16 unknowns. The 16 ridges will provide 16 different sets of 4 data points each to solve for the 16 unknowns of the matrix. The problem is thus overdetermined, allowing for the use of a least-squares regression method. This minimizes the impact of noise in the calibration measurement as well as allowing for looser tolerances. As shown in FIG. 1, the calibration medium 80 can be located adjacent to the disk 16 so that the tester 10 can periodically perform a self-calibration routine between testing of various recording heads without removal of the disk 16. Alternatively, the ridges may be deposited onto a disk to allow easy installation in different flying height testers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A calibration medium for a flying height tester, comprising:

a substrate which has a first transparent ridge that has a first thickness and a second transparent ridge that has a second thickness, wherein the second thickness is greater than the first thickness, said substrate further having an outer layer of reflective material located on an outer surface of said first and second ridges.

2. The calibration medium as recited in claim 1, further comprising a third ridge which has a tapered surface.

3. The calibration medium as recited in claim 1, wherein said substrate includes an internal layer of reflective material located on a transparent base member.

4. The calibration medium as recited in claim 3, wherein said first and second ridges are separated from said internal layer of reflective material by a layer of transparent material.

5. The calibration medium as recited in claim 1, further comprising an optical marker.

6. The calibration medium as recited in claim 1, wherein said first and second ridges each extend from an inner diameter of said substrate to an outer diameter of said substrate.

7. A flying height tester, comprising:

a spindle motor;

a transparent substrate mounted to said spindle motor;

a calibration medium that has a first transparent ridge which has a first thickness and a second transparent ridge that has a second thickness, wherein the second thickness is greater than the first thickness, said substrate further having an outer layer of reflective material located on an outer surface of said first and second ridges;

a light source which directs a light beam that is reflected from said reflective material, said first ridge and reflected from said second ridge; and, a detector that detects the light beam reflected from said first and second ridges.

8. The flying height tester as recited in claim 7, wherein said calibration medium has a third ridge which has a tapered surface.

9. The flying height tester as recited in claim 7, wherein said calibration medium includes an internal layer of reflective material located on a transparent base member.

10. The flying height tester as recited in claim 9, wherein said first and second ridges are separated from said internal layer of reflective material by a layer of transparent material.

11. The flying height tester as recited in claim 7, wherein said calibration medium has an optical marker.

12. The flying height tester as recited in claim 7, wherein said first and second ridges each extend from an inner diameter of said calibration medium to an outer diameter of said calibration medium.

13. A method for calibrating a flying height tester, comprising the steps of:

a) providing a calibration medium which has a first transparent ridge that has a first thickness, a second transparent ridge that has a second thickness and an outer layer of reflective material located on said first and second ridges, wherein the second thickness is greater than the first thickness;

b) reflecting a beam of light from said first ridge;

c) detecting the beam of light that is reflected from said first ridge;

d) reflecting the beam of light from said second ridge;

e) detecting the beam of light that is reflected from said second ridge; and, f) calibrating the flying height tester with the detected beam of light reflected from said first and second ridges.

14. The method as recited in claim 13, further comprising the step of mounting said calibration medium to a spindle motor before the light beam is reflected from said first ridge.

15. The method as recited in claim 13, further comprising the steps of reflecting the beam of light from a tapered ridge of said calibration medium and detecting the beam of light that is reflected from said tapered ridge.

16. A method for creating a calibration medium for a flying height tester, comprising the steps of:

a) providing a substrate;

b) forming a first transparent ridge which has a first thickness and a second transparent ridge which has a second thickness on said substrate, wherein the second thickness is greater than the first thickness; and, c) applying an outer reflective coating to an outer surface of said first and second ridges.

17. The method as recited in claim 16, wherein said first and second ridges are formed by applying transparent material to said substrate.

18. The method as recited in claim 16, wherein said first and second ridges are formed by etching said first and second ridges from said substrate.

19. The method as recited in claim 16, further comprising the step of forming an internal reflective layer in said substrate.

* * * * *